(12) United States Patent
Strobel et al.

(10) Patent No.: US 12,531,653 B2
(45) Date of Patent: Jan. 20, 2026

(54) LOW COMPLEXITY SOFT DECISION OPTICAL RECEIVER

(71) Applicant: MaxLinear, Inc., Carlsbad, CA (US)

(72) Inventors: Rainer Strobel, Munich (DE); Gert Schedelbeck, Munich (DE); Axel Geiler, Zorneding (DE)

(73) Assignee: MaxLinear, Inc., Carlsbad, CA (US)

( * ) Notice: Subject to any disclaimer, the term of this patent is extended or adjusted under 35 U.S.C. 154(b) by 0 days.

(21) Appl. No.: 18/778,843

(22) Filed: Jul. 19, 2024

(65) Prior Publication Data

US 2025/0038883 A1   Jan. 30, 2025

Related U.S. Application Data

(60) Provisional application No. 63/514,361, filed on Jul. 19, 2023.

(51) Int. Cl.
*H04L 1/00* (2006.01)
*H04B 17/309* (2015.01)
*H04L 25/49* (2006.01)

(52) U.S. Cl.
CPC ......... *H04L 1/0045* (2013.01); *H04B 17/309* (2015.01); *H04L 25/4917* (2013.01)

(58) Field of Classification Search
CPC ..... H04L 1/004; H04L 1/0045; H04L 1/0047; H04L 1/0048; H04L 1/005; H04L 1/0051; H04L 1/0052; H04L 1/0053; H04L 25/38; H04L 25/40; H04L 25/49; H04L 25/4917; H04L 25/4927; H04B 17/30; H04B 17/309; H04B 17/318; H04B 17/327; H04B 17/328; H04B 17/336; H04B 17/345; H04B 17/346
See application file for complete search history.

(56) References Cited

U.S. PATENT DOCUMENTS 5,654,991 A * 8/1997 Andren ................. H04L 7/0054
                                                    375/E1.004
6,285,861 B1 * 9/2001 Bonaccorso ......... H04B 1/7115
                                                    455/296
6,504,865 B1 * 1/2003 Liang .................. H04L 25/4927
                                                    375/216

(Continued)

OTHER PUBLICATIONS

International Search Report and Written Opinion of PCT Application No. PCT/US2024/038890 mailed Dec. 4, 2024, 12 pgs.

(Continued)

*Primary Examiner* — James M Perez
(74) *Attorney, Agent, or Firm* — Buchalter; Jason W. Croft

(57) ABSTRACT

Technology is disclosed for an optical receiver. The optical receiver may include an optical and digital signal processing (ODSP) device. The ODSP device may include a photodiode operable to convert an optical signal to an electrical signal; a digital signal processor operable to generate a digital signal based on the electrical signal; a quantization component operable to generate a quantized output signal based on the digital signal; and a processing device. The processing device may be operable to measure one or more signal statistics of the digital signal; and identify one or more quantization thresholds, wherein the one or more quantization thresholds are computed based on the one or more signal statistics.

21 Claims, 12 Drawing Sheets

(56) References Cited

U.S. PATENT DOCUMENTS

| | | | | |
|---|---|---|---|---|
| 6,956,510 | B1* | 10/2005 | He | H04L 1/0041 |
| | | | | 375/219 |
| 7,023,868 | B2* | 4/2006 | Rabenko | H04N 21/2383 |
| | | | | 375/E7.002 |
| 7,190,741 | B1* | 3/2007 | Manning | H04B 17/336 |
| | | | | 375/285 |
| 7,688,927 | B2* | 3/2010 | Fraasch | H03D 13/004 |
| | | | | 375/371 |
| 8,155,530 | B2* | 4/2012 | Ali | H04B 10/541 |
| | | | | 398/147 |
| 8,621,307 | B2* | 12/2013 | Cai | H04L 1/0045 |
| | | | | 370/335 |
| 8,855,251 | B2* | 10/2014 | Zeng | H04W 52/52 |
| | | | | 375/345 |
| 9,252,809 | B2* | 2/2016 | Hirth | H04L 1/0047 |
| 9,363,033 | B2* | 6/2016 | Dutta | H04J 14/08 |
| 9,762,379 | B2* | 9/2017 | Kaneda | H04L 7/0075 |
| 10,153,892 | B2* | 12/2018 | Kliewer | H04L 1/0055 |
| 10,601,462 | B2* | 3/2020 | Walley | H04L 12/6418 |
| 10,873,366 | B2* | 12/2020 | Strobel | H04B 10/2589 |
| 11,444,813 | B1* | 9/2022 | Wang | H04L 25/08 |
| 11,539,605 | B2* | 12/2022 | Latremouille | H04L 43/0823 |
| 2005/0024253 | A1* | 2/2005 | Adamiecki | H03M 5/18 |
| | | | | 341/169 |
| 2006/0176934 | A1* | 8/2006 | Riedel | H03L 7/197 |
| | | | | 375/E1.001 |
| 2013/0301763 | A1* | 11/2013 | Zeng | H04L 27/3809 |
| | | | | 375/345 |
| 2014/0108879 | A1* | 4/2014 | Hirth | H03M 13/015 |
| | | | | 714/751 |
| 2019/0319668 | A1* | 10/2019 | Strobel | H04B 10/2507 |
| 2020/0007133 | A1* | 1/2020 | Littmann | H03L 7/0816 |
| 2020/0084069 | A1* | 3/2020 | Rane | H04L 25/03057 |
| 2020/0112371 | A1* | 4/2020 | Stojanovic | H04B 10/5561 |
| 2020/0212943 | A1* | 7/2020 | Banin | H04L 25/49 |
| 2021/0091983 | A1* | 3/2021 | Barrier, IV | H04L 27/0014 |
| 2021/0135751 | A1* | 5/2021 | Razzell | H04B 10/6165 |
| 2021/0136777 | A1* | 5/2021 | Lou | H04L 5/14 |
| 2022/0190931 | A1* | 6/2022 | Strobel | H04B 10/69 |
| 2022/0286332 | A1* | 9/2022 | Strobel | H03M 13/4146 |
| 2023/0094919 | A1* | 3/2023 | Wu | H04B 17/29 |
| | | | | 375/227 |
| 2023/0136077 | A1* | 5/2023 | Lu | H04L 1/1812 |
| | | | | 370/328 |
| 2023/0155714 | A1* | 5/2023 | Schedelbeck | H04J 14/0235 |
| | | | | 398/72 |
| 2023/0198670 | A1* | 6/2023 | Strobel | H04L 1/0057 |
| | | | | 370/310 |
| 2023/0361894 | A1* | 11/2023 | Bhamri | H04W 24/10 |
| 2024/0129168 | A1* | 4/2024 | Wang | H04L 25/4917 |
| 2025/0030441 | A1* | 1/2025 | Strobel | H03M 13/3927 |
| 2025/0038883 | A1* | 1/2025 | Strobel | H04B 17/309 |
| 2025/0240101 | A1* | 7/2025 | Stojanovic | H04B 10/616 |

OTHER PUBLICATIONS

Invitation to Pay Additional Fees for PCT Application No. PCT/US2024/038890 mailed Sep. 13, 2024, 2 pgs.

* cited by examiner

LOW COMPLEXITY SOFT DECISION OPTICAL RECEIVER

RELATED APPLICATION

This application claims the benefit of U.S. Provisional Application No. 63/514,361, filed Jul. 19, 2023, the disclosure of which is incorporated herein by reference in its entirety.

This disclosure relates to passive optical networks, and more specifically, to correcting bit errors in a transmission using soft decision forward error correction.

BACKGROUND

Unless otherwise indicated herein, the materials described herein are not prior art to the claims in the present application and are not admitted to be prior art by inclusion in this section.

A passive optical network (PON) is a fiber optic network that may be used for the connection between Internet Service Providers and their customers. A passive optical network may include an optical line terminal at a service provider's hub, passive optical splitters, and optical network units. 10G-PON may deliver internet access rates up to 10 Gbit/s. 50G-PON may deliver internet access rates up to 50 Gbit/s. To provide these rates, enhanced methods for receiving optical signals would be useful.

The subject matter claimed in the present disclosure is not limited to examples that solve any disadvantages or that operate only in environments such as those described above. Rather, this background is only provided to illustrate one example technology area where some examples described in the present disclosure may be practiced.

SUMMARY

In one example, a device may include an optical and digital signal processing (ODSP) device. The ODSP device may include a photodiode that may convert an optical signal to an electrical signal. The ODSP device may include a digital signal processor that may generate a digital signal based on the electrical signal. The ODSP device may include a quantization component that may generate a quantized output signal based on the digital signal. The ODSP device may include a processing device. The processing device may measure one or more signal statistics of the digital signal. The processing device may identify one or more quantization thresholds. The one or more quantization thresholds may be computed based on the one or more signal statistics.

In another example, a device may include an electrical link between an optical and digital signal processing (ODSP) device and a transmission control layer (TCL) device. The TCL device may receive, at the TCL device from an ODSP device, one or more symbols via a high-speed electrical interface. The TCL device may receive, at the TCL device from the ODSP device, one or more signal statistics of a digital signal of a digital signal processor at the ODSP device. The TCL device may compute, at the TCL device, one or more quantization thresholds based on the one or more signal statistics of the digital signal of the digital signal processor at the ODSP device. The TCL device may compute, at the TCL device, one or more log likelihood ratio (LLR) values based on the one or more symbols and the one or more quantization thresholds. The TCL device may perform, at the TCL device, forward error correction (FEC) decoding based on the one or more LLR values.

In another example, a method may include converting, at a photodiode of an optical and digital signal processing (ODSP) device, an optical signal to an electrical signal. The method may include generating, at an analog to digital converter (ADC) of the ODSP device, a digital signal based on the electrical signal. The method may include identifying, at a processing device of the ODSP device, one or more signal statistics of the digital signal. The method may include computing, at one or more of the processing device of the ODSP device or a processing device of a transmission control layer (TCL) device, one or more quantization thresholds based on the one or more signal statistics. The method may include generating, at a quantization component of the ODSP device, a quantized output signal based on the digital signal and the one or more quantization thresholds.

The objects and advantages of the examples will be realized and achieved at least by the elements, features, and combinations particularly pointed out in the claims.

Both the foregoing general description and the following detailed description are given as examples and are explanatory and are not restrictive of the invention, as claimed.

BRIEF DESCRIPTION OF THE DRAWINGS

Examples will be described and explained with additional specificity and detail through the use of the accompanying drawings in which.

DESCRIPTION OF EMBODIMENTS

Figure 1:
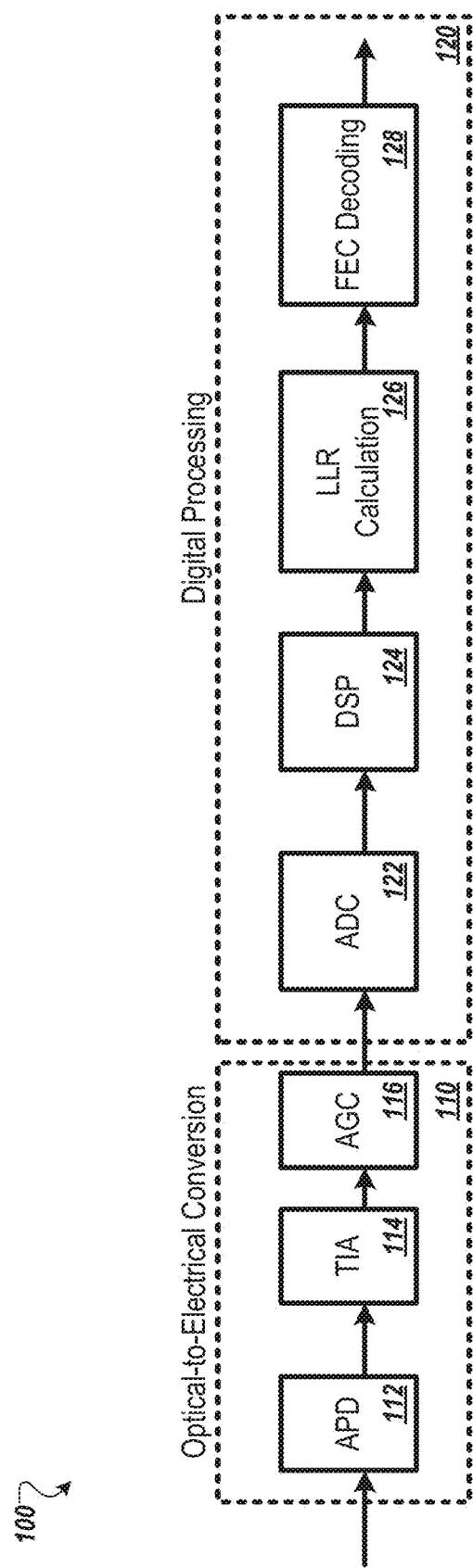
FIG. 1 illustrates an example integrated passive optical network (PON) digital receiver with a digital signal processing (DSP) unit and soft decision forward error correction (FEC).

Passive optical networks (PONs) may use low-density parity-check (LDPC) codes in instances in which the PON supports a data rate of at least 10 Gb/s per wavelength. Various digital processing operations may be performed, including instances in which the data rate is much higher, such as up to 50 Gb/s (50G PON). In some instances, conversion of an optical signal to an electrical signal may be close to a digital receiver chip to reduce signal degradation.

As such, in some circumstances, a DSP device may include a combination of an optical to electrical conversion component and a digital signal processing component (i.e., an ODSP device). In some circumstances, a high speed PON (e.g., 25G PON, 50G PON, etc.) may include a separate device that may perform forward error correction (FEC) that may receive a hard decision bit stream input generated by the ODSP device.

Using low density parity check (LDPC) codes for error correction in a PON system may facilitate soft decision inputs to a FEC decoder, where the soft decision inputs may enhance performance of the FEC decoder relative to hard decision inputs. A soft decision receiver in a PON may derive the soft decision information from a signal amplitude (e.g., as opposed to a bit value determined from the signal). In some circumstances, a soft decision from a DSP device may be transmitted to the FEC decoder for decoding, including instances in which the FEC module is not located adjacent to the DSP device.

A high speed electrical interface may be used to transmit the soft decision information (e.g., which may be log likelihood ratio (LLR) values determined by a component in the ODSP device). LLR values may include approximately a six bit resolution, where one bit may be a sign bit and the remaining five bits may be amplitude bits. As such, in a 50G PON, approximately a 300 Gb/s connection between the ODSP device and the FEC decoder may be used. In many circumstances, a 300 Gb/s connection may be impractical and/or unfeasible due, at least in part, to costs and/or power consumption associated with such a connection.

Disclosed herein is a method to use soft decision decoding with a limited data rate between an ODSP device and a TCL device by limiting the resolution of the exchanged amplitude information to a "few bits", e.g., 2 bits per symbol corresponding to 100 Gbit/s connectivity for 50 Gbit/s line rate.

Passive optical network with data rates>10 Gbit/s per wavelength introduce LDPC codes for forward error correction (FEC). Furthermore, at data rates of 50 Gbit/s per wavelength and higher receiver side digital equalization is introduced. Analog-to-digital converters (ADC) may be used to perform digital equalization. LDPC decoders at the receiver may benefit from soft decision input, where the signal amplitude is evaluated, not only the (hard decision) received bit sequence. Soft decision input uses analog-to-digital conversion. Hereby, log-likelihood ratios (LLR) may be derived from the amplitude information of the received signal and provided for the FEC decoder.

Soft decision decoding may be performed in a PON that includes an electrical connection between an ODSP device and a TCL device. The resolution of an exchanged amplitude information associated with the transmitted data may be limited (for example, the exchanged amplitude may be approximately two bits per symbol), such that the electrical connection may be approximately 100 Gb/s when the PON line rate is approximately 50 Gb/s (e.g., 50G PON). In such instances, a PON implementing one or more aspects of the present disclosure may support soft decision decoding associated with better performance by the decoder at a data rate (e.g., 100 Gb/s) between devices included in the PON that may include lower costs and/or power consumption relative to existing approaches.

A low-complexity soft decision optical receiver (herein "receiver") may include an optical to electrical conversion device plus DSP device (herein "ODSP device") communicatively coupled to a FEC decoder plus transmission control layer module (herein "TCL device"). The ODSP device may provide a low resolution (e.g., two or three bits per symbol), soft decision output to the TCL device via a quantization process within the ODSP device. A decision threshold associated with the soft decision output may be optimized with respect to the signal characteristics and/or standards associated with the FEC (included in the TCL device). For example, signal statistics may be measured and or evaluated by the ODSP device and a threshold optimization may be performed at the ODSP device, the TCL device, and/or other locations. For example, the threshold optimization may be performed by the ODSP device in response to receiving FEC decoder information from the TCL device. In another example, the threshold optimization may be performed by the TCL device in response to receiving signal statistics from the ODSP device, and the TCL device may transmit the optimized threshold back to the ODSP device.

In these and other examples, the receiver may experience enhanced performance, such as enhanced performance to the FEC decoder, including lower cost and/or complexity relative to prior approaches. Alternatively, or additionally, the receiver may include one or more pluggable optics devices that may be used in performing the operations described herein, where the pluggable optics devices may be physically located adjacent or remote from one another on a circuit board and an electrical interface may support the operations there between. Alternatively, or additionally, the electrical interface may be a low cost and/or a non-complex addition to the receiver and may facilitate the transfer of data between the ODSP device and the TCL device on a printed circuit board (or integrated circuit, etc.) regardless of the physical distance between the ODSP device and the TCL device.

Examples of the present disclosure will be explained with reference to the accompanying drawings.

As illustrated in the receiver architecture 100 in FIG. 1, an optical signal may be converted to an electrical signal in the optical-to-electrical conversion block 110. The optical signal may be directed to a diode (e.g., an avalanche photo diode (APD) 112) where the optical signal may be converted to an electrical signal. The electrical signal may be amplified to a higher level with a fixed gain by an amplifier (e.g., transimpedance amplifier (TIA) 114). The signal having the higher level and the fixed gain may be further amplified to a suitable level for analog-to-digital conversion at a gain control block (e.g., analog gain control (AGC) 116).

The analog electrical signal received from the AGC 116 may be converted to a digital signal in the digital processing block 120. The analog electrical signal may be converted to a digital signal at the analog-to-digital converter (ADC) 122. The resulting signal from the analog-to-digital converter may be directed to a digital signal processing (DSP) unit 124. The output of the DSP unit 124 may be directed to a log likelihood ratio (LLR) calculation block 126, where LLR values may be calculated. The resulting signal may be directed to a forward error correction (FEC) decoding block 128.

In the receiver architecture 100 where digital equalization and FEC decoding are performed in the same device (e.g., an integrated circuit), soft decision input may be generated from the equalizer output amplitudes, with the help of an internal high-speed connection between LLR calculation and digital equalizer. The receiver architecture 100 includes an optical-to-electrical conversion that is performed very close to the digital receiver chip (e.g., within a few millimeters of distance) to avoid performance degradation of the high-speed signals on the printed circuit board (PCB). Many applications use pluggable optical devices, where the distance between digital receiver and optical-to-electrical conversion is much higher and contains a connector.

Figure 2:
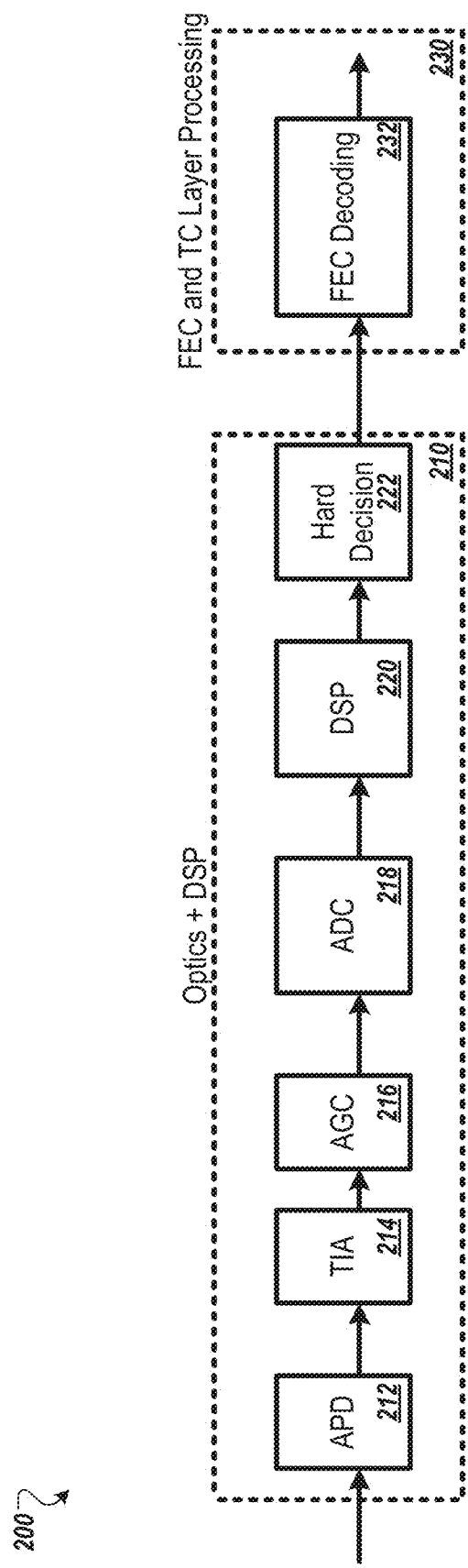
FIG. 2 illustrates an example PON receiver with an ODSP device and digital interface to the TCL device.

When pluggable optical devices are used, the electrical-to-optical conversion and DSP may be integrated into an optics+DSP device (e.g., an ODSP device 210), as illustrated in FIG. 2. The receiver architecture 200 may include an ODSP device 210 and an FEC and Transmission Control Layer (TCL) Processing device (e.g., a TCL device 230). The ODSP device 210 may include one or more of: an APD 212, a TIA 214, an AGC 216, an ADC 218, a DSP unit 220, or a hard decision 222. The TCL device 230 may include an FEC decoding block 232. The ODSP device 210 may be connected to the TCL device 230. The receiver architecture in FIG. 2 may not use soft decision input to the FEC decoding block 232 because the FEC decoding block 232 input is a bit stream which is generated by hard decision 222 on the ODSP device 210.

Figure 3:
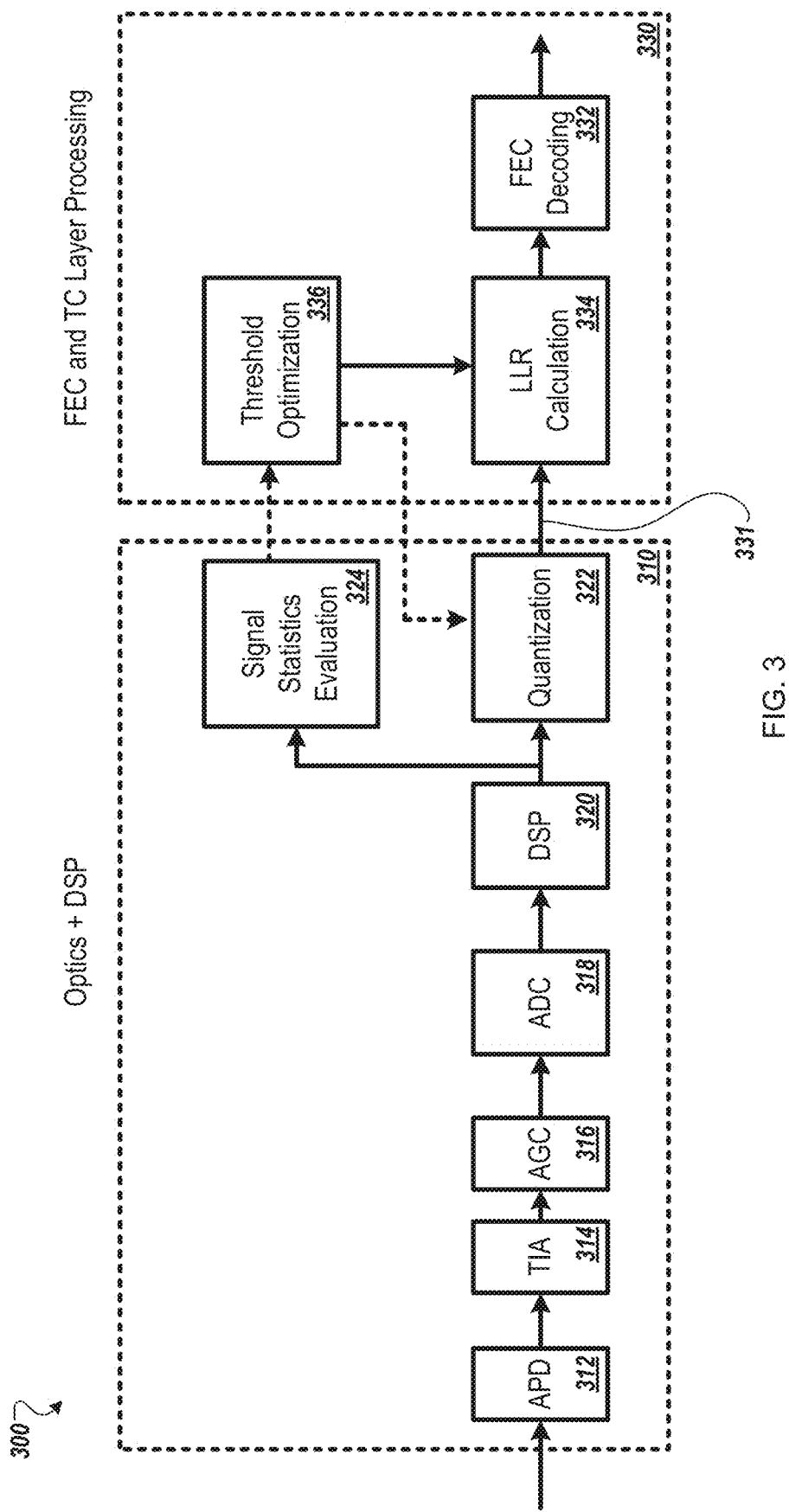
FIG. 3 illustrates an example PON receiver with an ODSP device and TCL device.

As illustrated in FIG. 3, a receiver architecture 300 may be operable to facilitate soft decision input to the TCL device 330. An ODSP device 310 may be coupled with a TCL device 330 via an electrical interface 331 (e.g., high-speed). The ODSP device 310 may include one or more of: an APD 312, a TIA 314, an AGC 316, an ADC 318, a DSP 320, or the like. The ODSP device 310 may include a quantization block 322, a signal statistics evaluation block 324, or the like. The TCL device 330 may include one or more of: an FEC decoding block 332, an LLR calculation block 334, a threshold optimization block 336, or the like.

In the ODSP device 310, an optical signal may be converted to a soft-decision output signal. The optical signal may be directed to the APD 312 where the optical signal may be converted to an electrical signal. The electrical signal from the APD 312 may be directed to the TIA 314, where the electrical signal may be amplified to an amplified electrical signal. The amplified electrical signal may be directed to the AGC 316 where the amplified electrical signal may be further amplified to be suitable for input to the ADC 318. At the ADC 318, the signal may be converted to a digital signal. The digital signal may be directed to a DSP 320.

The output signal of the DSP 320 may be directed to one or more of a quantization block 322 or a signal statistics evaluation block 324. The quantization block 322 may quantize the signal (e.g., using one or more quantization thresholds). The quantization block 322 may perform a quantization of the DSP 320 amplitude output signal so that a few transmitted bits (e.g., N=2, or N=3 bits per symbol) may represent the DSP amplitude output signal (e.g., as opposed to a hard decision). Alternatively or in addition, an analog equalization may be performed (e.g., in lieu of the ADC 318 and the DSP 320 in the ODSP device 310). The quantized signal from the quantization block 322 may be directed to the TCL device 330 via the electrical interface 331 which may be a high-speed electrical interface.

The electrical interface 331 between the ODSP device 310 and the TCL device 330 may provide a data rate substantially equal to the line rate times the number of transmitted bits by the DSP module. For example, in instances in which the transmitted bits is two or three in a 50G PON (50 Gb/s line rate), the electrical interface may be configured to support a data rate of 100 Gb/s or 150 Gb/s, respectively.

An evaluation of signal statistics may be performed by the ODSP device 310 (e.g., the signal statistics evaluation block 324) on an output from the DSP 320. The output of the signal statistics evaluation block 324 may be sent to the threshold optimization block 336 via an overhead channel (e.g., a low rate overhead channel). The threshold optimization block 336 may provide one or more quantization thresholds to the quantization block 322 via an overhead channel (e.g., a low-rate overhead channel). The one or more quantization thresholds may depend on the signal characteristics associated with the DSP 320 output signal. The DSP 320 output signal may be provided to the threshold optimization block 336 included in the TCL device 330.

In some examples, the low rate overhead channel(s) may be an in-band communication via the electrical interface. Alternatively, or additionally, the low rate overhead channel(s) may be transmitted via a dedicated low rate interface (e.g., a low speed communication channel) between the ODSP device 310 and the TCL device 330.

The TCL device 330 may compute one or more log likelihood ratio (LLR) values, at the LLR calculation block 334, based on one or more symbols received via the high-speed electrical interface 331 and based on one or more quantization thresholds received from the threshold optimization block 336. In addition, the quantization output (e.g., the transmitted bits) may be obtained by the TCL device 330 and the LLR calculation block 334 may perform an LLR calculation and/or provide the LLR value to the FEC decoding block 332.

Figure 4:
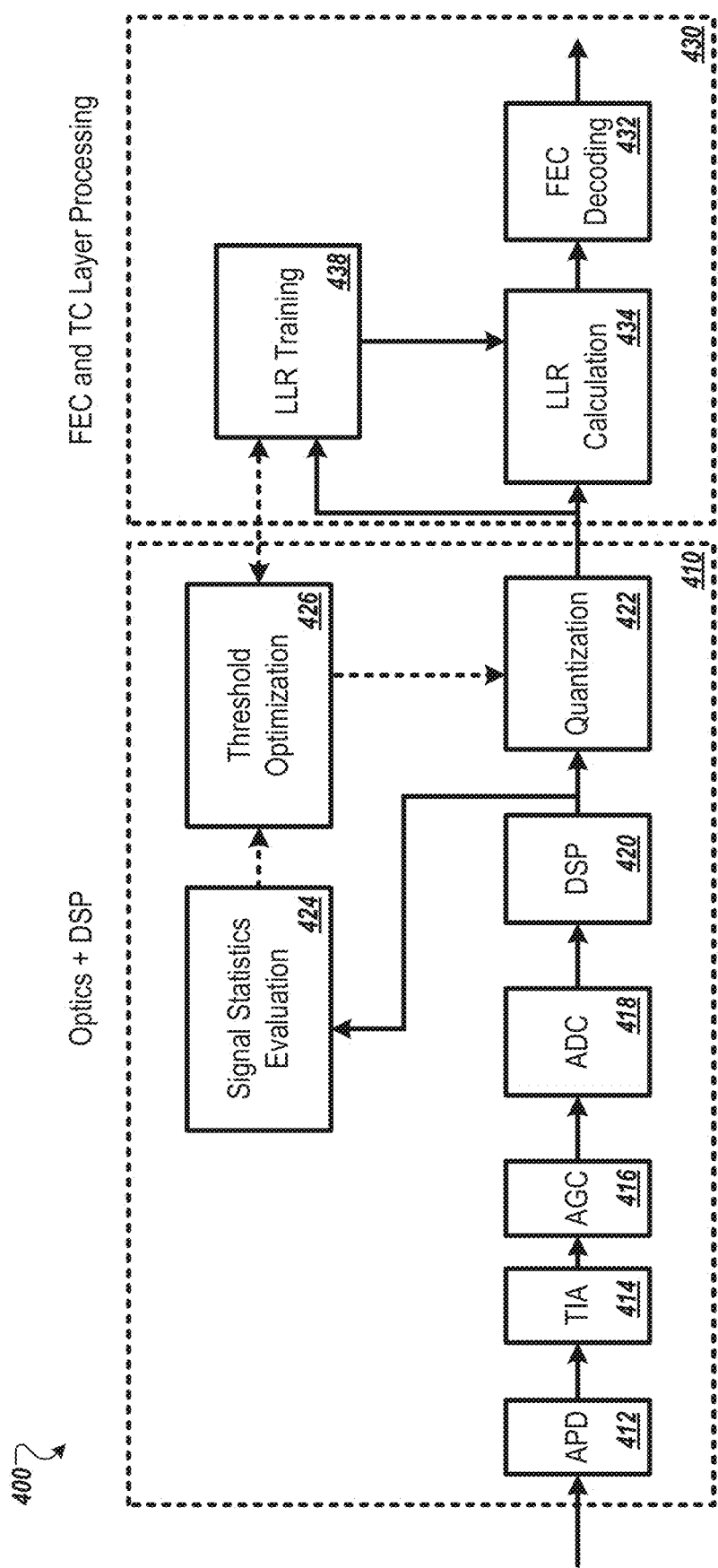
FIG. 4 illustrates an example PON receiver with an ODSP device and TCL device.

As illustrated in the receiver architecture 400 in FIG. 4, an ODSP device 410 may be coupled with a TCL device 430 via an electrical interface 431 (e.g., high-speed), which may be the same or similar as FIG. 3. The ODSP device 410 may include one or more of the components in the ODSP device 310. That is, the ODSP device 310 may include one or more of an APD 412, a TIA 414, an AGC 416, an ADC 418, a DSP 420, a quantization block 422, or a signal statistics evaluation block 424. The threshold optimization block 426 may be located in the ODSP device 410 so that the threshold optimization may be performed by the ODSP device 410 (e.g., components included in the ODSP device). In such instances, the signal statistics and/or the threshold optimization may be performed and/or remain local to the ODSP device 410 (e.g., not transmitted to another device).

The TCL device 430 may include one or more of the components in the ODSP device 410. That is, the TCL device 430 may include one or more of an FEC decoding block 432, an LLR calculation block 434, or the like. In addition or alternatively, the LLR training block 438 may be located in the TCL device 430. The LLR training block 438 may obtain statistic information associated with the transmitted bits from the ODSP device 410 that may be transmitted via the electrical interface 431 between the ODSP device 410 and the TCL device 430. Alternatively, or additionally, the LLR training block 438 may obtain the statistic information associated with the transmitted bits via an interface (e.g., low-rate) between the ODSP device 410 and the TCL device 430.

Operations associated with the signal statistics evaluation block 324, 424, the threshold optimization block 336, 426, and the LLR calculation block 334, 434 may be described more fully herein under the respective headings. The operations performed by one or more of the signal statistics evaluation block 324, 424, the threshold optimization block 336, 426, and/or the LLR calculation block 434, 434 may be performed as illustrated in FIGS. 3 and 4, unless otherwise noted.

Signal Statistics Block

An optimal quantization of an output from the DSP 320, 420 (e.g., the DSP signal) in the ODSP device 310, 410 may maximize mutual information, as described in the threshold optimization block section herein. The input to the threshold optimization block may be a conditional probability density function (PDF) $f_{xy}(x,y)$ for a transmitted bit $x \in \{0,1\}$ and a received amplitude y, where y may be digital amplitude information that may include a high resolution, such that y may be considered continuous in amplitude. In some examples, the DSP signal (e.g., received amplitude y) may be a zero-mean signal (e.g., $y_{th}=0$ may be the decision threshold that give fifty percent ones and fifty percent zeros in a hard decision operation). In some examples, the scaling of the DSP signal may be selected such that $\mu_1=-\mu_0=1$ on the DSP signal with additive noise, where $f_{xy}(x=1,y)=\mu_1=f_{xy}(x=0,y)=\mu_0$.

The conditional PDF $f_{xy}(x,y)$ may be obtained from a histogram measurement. In such instances, the values of the transmitted bits x may be obtained, such as through a synchronization pattern and/or a preamble that may be known to the receiver. Alternatively, or additionally, the transmitted bits x may be obtained via feedback from the FEC decoding block 332, 432 to the signal statistics evaluation block 324, 424.

In instances in which the values of the transmitted bits x are obtained with respect to a time t and corresponding to a received signal $y_t$, a histogram may be determined upon receiving T known symbols by counting:

$$n_{xy} = \sum_{t=1,\ldots,T} \begin{cases} 1 & x_t = x \text{ and } y_t = y \\ 0 & \text{otherwise} \end{cases}$$

and determining the PDF to be $$f_{xy}(x, y) = \frac{n_{xy}}{T \Delta y},$$

with a quantization step $\Delta y$ of the received signal $y_t$.

Signal statistics associated with the DSP signal may include receiver noise, such as thermal noise generated by the TIA 314, 414 and/or quantum noise generated by the avalanche photo diode (APD) 312, 412. In such instances, the conditional PDF may be approximated using a Gaussian PDF. In some examples, a Gaussian signal may be described using a mean $\mu$ and variance $\sigma^2$. The quantum noise may cause the variance of a transmitted zero ($\sigma_0^2$) to be different from the variance of a transmitted one ($\sigma_1^2$), such that $\sigma_0^2 \neq \sigma_1^2$. To obtain an approximated Gaussian PDF, a mean and a variance for transmitted zeros and transmitted ones (e.g., $\mu_0$, $\mu_1$, $\sigma_0^2$ and $\sigma_1^2$) may be obtained using the following equations:

$$\mu_0 = \frac{1}{T - \sum_{t=1,\ldots,T} x_t} \sum_{t=1,\ldots,T, x_t=0} y_t$$

$$\mu_1 = \frac{1}{\sum_{t=1,\ldots,T} x_t} \sum_{t=1,\ldots,T, x_t=1} y_t$$

-continued $$\sigma_0^2 = \frac{1}{T - \sum_{t=1,\ldots,T} x_t} \sum_{t=1,\ldots,T, x_t=0} |y_t - \mu_0|^2$$

$$\sigma_1^2 = \frac{1}{\sum_{t=1,\ldots,T} x_t} \sum_{t=1,\ldots,T, x_t=1} |y_t - \mu_1|^2$$

In these and other examples, the approximated Gaussian PDF may use a fewer number of known symbols T to obtain an accurate PDF relative to the histogram approach.

The ODSP device 310, 410 may not know the transmitted bit sequence $x_t$, but the ODSP device 310, 410 may have access to a hard decision output $\bar{x}_t$ represented by the following:

$$\bar{x}_t = \begin{cases} 0 & y_t < 0 \\ 1 & y_t \geq 0 \end{cases}$$

In instances in which the hard decision output $\bar{x}_t$ is used as opposed to $x_t$ as included in the approximated Gaussian PDF above, an under estimation of $\sigma_0^2$ and $\sigma_1^2$ may be present as the DSP signal may be incorrectly evaluated for $y_t < 0 \wedge x_t = 1$ and for $y_t > 0 \wedge x_t = 0$. In instances in which the DSP signal is at least approximately a Gaussian signal, the variance estimation error may be known and/or corrected. Correction values that may be used to correct the variance estimation may be included in a look up table that may reflect a dependency between a signal-to-noise ratio (SNR) associated with a blind measurement and a SNR associated with an actual measurement.

An example look up table that may be used for correcting the variance estimation may be similar to Table 1.

TABLE 1

Measured SNR From Blind Measurement Vs. Correct SNR For The Example $\sigma_0^2 = \sigma_1^2 = \sigma^2$ And $SNR = \frac{1}{\sigma^2}$

| Correct SNR/dB | 0 | 1 | 2 | 3 | 4 | 5 | 6 | 7 | 8 | 9 | 10 |
|---|---|---|---|---|---|---|---|---|---|---|---|
| Blind measurement SNR/dB | 1.9 | 2.6 | 3.3 | 4 | 4.7 | 5.5 | 6.3 | 7.2 | 8.1 | 9 | 10 |

Figure 5A:
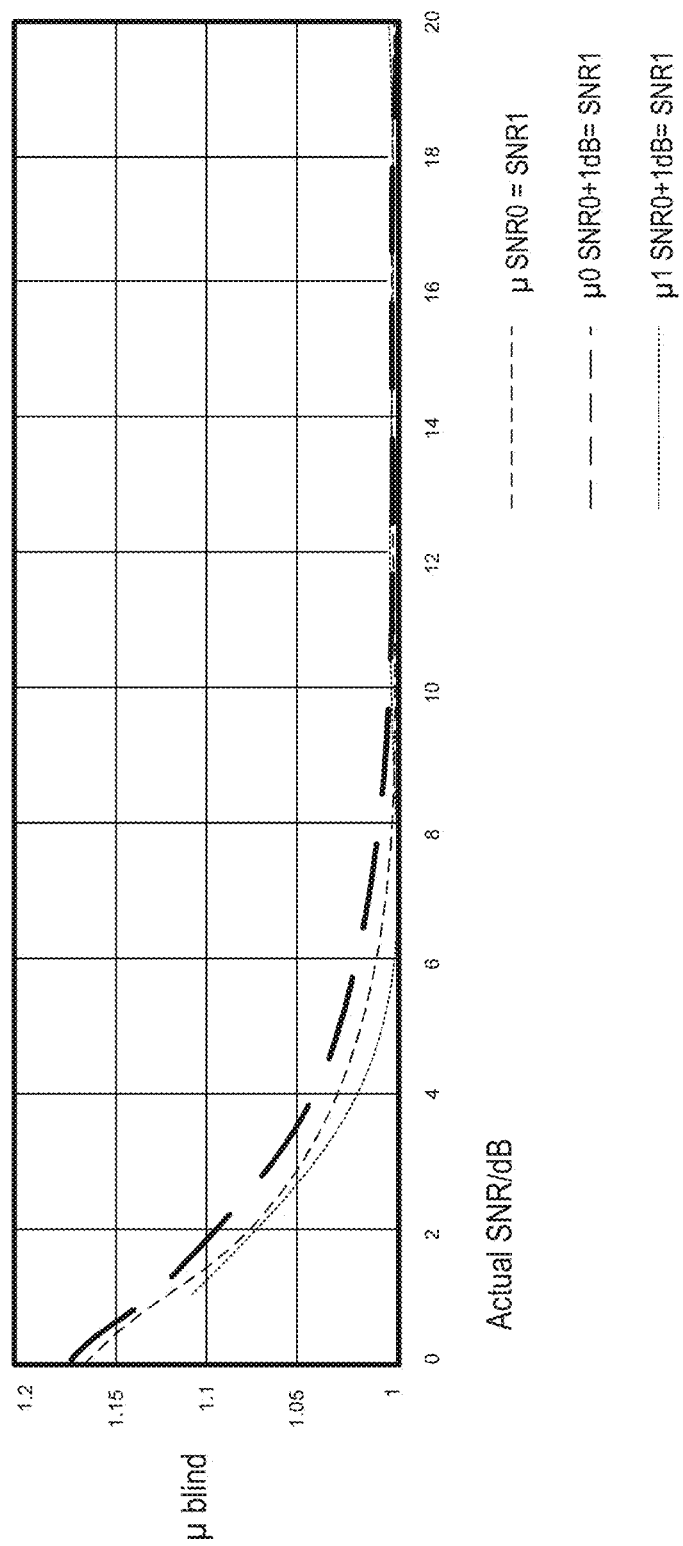
FIG. 5A illustrates an example graph of average ($\mu$) blind as a function of actual signal-to-noise ratio (SNR)/decibels (dB).

FIG. 5A illustrates the difference between actual signal mean and blind measurement for a Gaussian signal with: (i) equal SNR on 0 and 1 transmitted, (ii) 1 dB higher SNR for 1 transmitted vs. 0 transmitted.

Figure 5B:
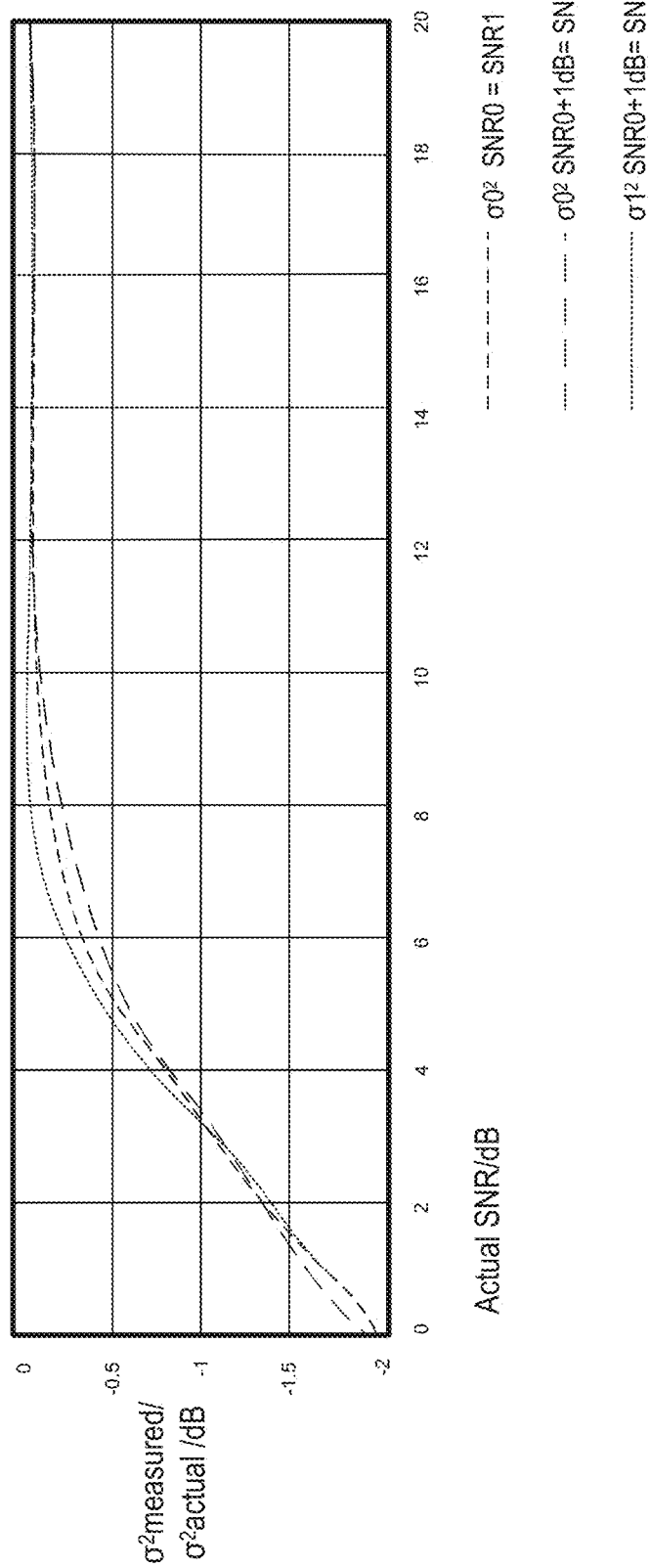
FIG. 5B illustrates an example graph of $\sigma^2$measured/$\sigma^2$actual/dB as a function of SNR/dB.

FIG. 5B illustrates the difference between actual variance and the blind measurement for Gaussian signal with: (i) equal SNR on 0 and 1 transmitted, (ii) 1 dB higher SNR for 1 transmitted vs. 0 transmitted.

When a blind Gaussian approximation of the signal statistics is used, the ODSP device 310, 410 may not include knowledge about the DSP signal (e.g., the preamble bits and/or the position of the bits) which may simplify the design and/or operation of the ODSP device 310, 410. The use of blind Gaussian approximation may be used when the signal statistics associated with the DSP signal may be approximately Gaussian.

Threshold Optimization

As illustrated in FIGS. 3 and 4, a threshold optimization may be performed (e.g., in threshold optimization block 336, 426) using an output from the signal statistics evaluation block 324, 424. The threshold optimization block 336, 426 may be located in one or more of the ODSP device 310 or the TCL device 430.

Figure 6:
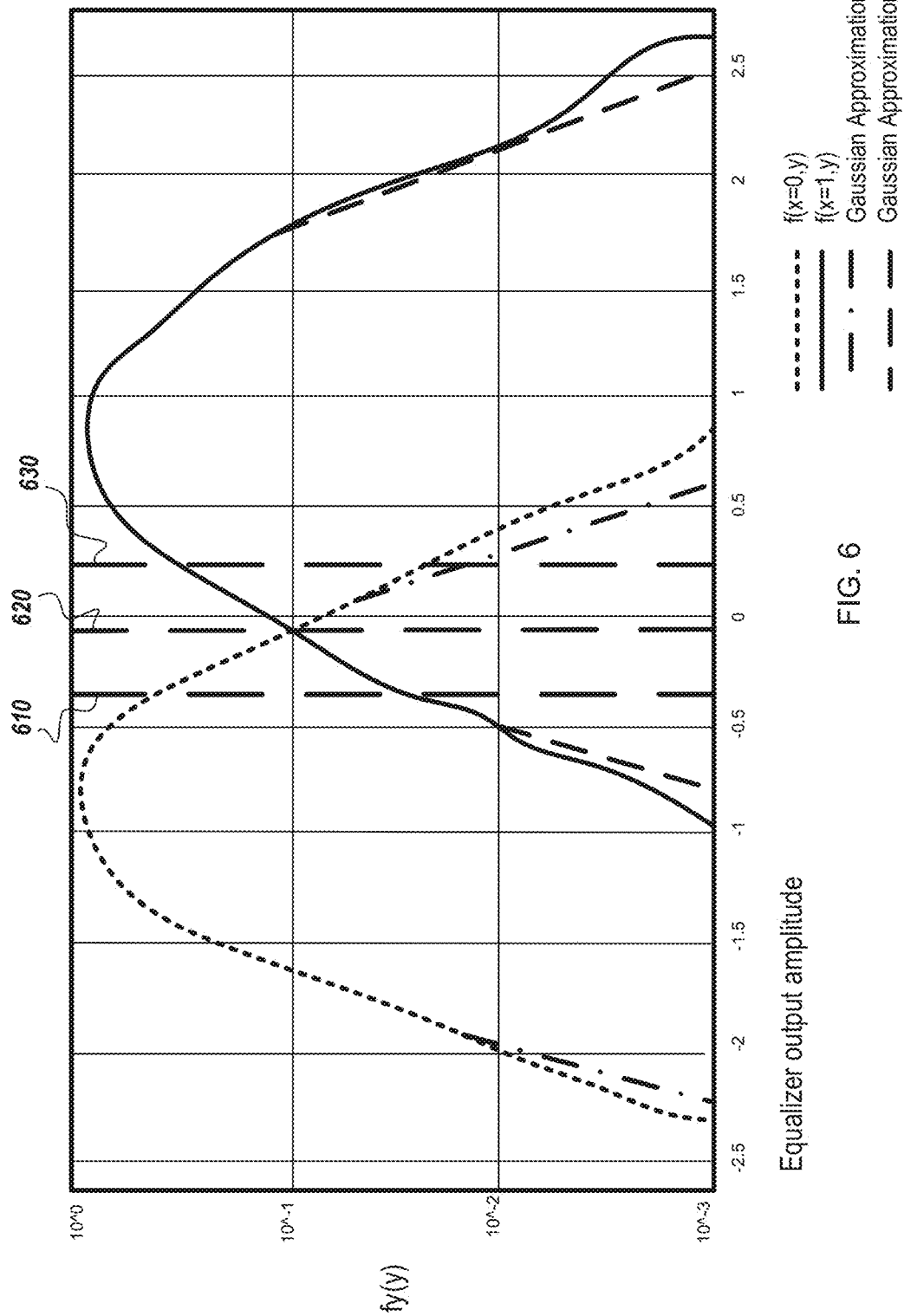
FIG. 6 illustrates an example of threshold optimization for a 2-bit equalizer output signal.

An example conditional PDF associated with a DSP signal in a 50G PON is illustrated in FIG. 6. Further, FIG. 6 includes optimized thresholds 610, 620, 630 for quantization using two bits per symbols (e.g., three thresholds illustrated). As illustrated, a first PDF may have a function, f(x=0, y) and a second PDF may have a function, f(x=1, y). For the first PDF, a Gaussian approximation does not coincide with the first PDF and, for the second PDF, a Gaussian approximation does not coincide with the second PDF.

The thresholds may be optimized, such as in view of a minimum mean squared error (e.g., a Lloyd-max quantizer). In instances in which a soft decision receiver is used (e.g., a soft decision FEC decoder), mutual information $I(x,y_q)$ between a transmit signal x and an quantized signal $y_q$ may be included in the optimization objective. In some prior approaches, the threshold optimization may be used to optimize ADC quantization of a PON receiver that may not include the DSP 320, 420. A digital signal may be quantized to a reduced number of bits, such that the number of bits in the transmitted signal from the ODSP device 310, 410 to the TCL device 330, 430 may be reduced.

The signal output by the quantization block 322, 422 (e.g., the quantized signal $y_q$) may be described by a joint probability $p_{xy_q}(x,y_q)$ between the transmit signal x and the quantized signal $y_q$. The joint probability may be obtained by integrating the PDF ($f_{xy}(x,y)$) of the input signal y to the quantization block over an interval corresponding to the decision thresholds $y_{th,i-1}$ and $y_{th,i}$ that define $y_q$. For example, an equation for the joint probability may be:

$$p_{xy_q}(x, y_q) = \int_{s=y_{th,i-1}}^{y_{th,i}} f_{xy}(x, y = s) ds.$$

The mutual information ($I(x,y_q)$) for an input signal x and an output signal $y_q$ may be obtained by the following equation:

$$I(x, y_q) = \sum_{x \in l_x} \sum_{y_q \in l_{y_q}} p_{xy_q}(x, y_q) \log_2 \left( \frac{p_{xy_q}(x, y_q)}{p_x(x) p_{y_q}(y_q)} \right)$$

where $p_x(x)$ is the probability for x being transmitted, and $p_{y_q}(y_q) = p_{xy_q}(0,y_q) + p_{xy_q}(1,y_q)$ is the probability to receive $y_q$. The input signal x and/or the output signal $y_q$ may be discrete values.

Obtaining and using the PDF $f_{xy}(x,y)$ and/or the corresponding cumulative density function (CDF) $F_{xy}(x,y)$ for a received amplitude y and a transmitted bit x, where $F_y(y) = F_{xy}(0,y) + F_{xy}(1,y)$, an optimal threshold may be determined using one or more optimization algorithms, such as the gradient method. In such instances, thresholds may be represented by $y_{th,i}$ where for a two bit quantized output, there may be four different levels. Accordingly, three thresholds may be determined, $y_{th,1}$, $y_{th,2}$, and $y_{th,3}$. In some examples, updating the thresholds may be represented by $$y_{th,i}^{t+1} = y_{th,i}^{t} + \alpha \frac{\partial I(x, y)}{\partial y_{th,i}},$$

where α is a step size and the gradient may be determined using the equation:

$$\frac{\partial I(x, y)}{\partial y_{th,i}} = \sum_{x \in 0,1} f_{xy}(x, y_{th,i}) \log \left( \frac{F_{xy}(x, y_{th,i-1}) - F_{xy}(x, y_{th,i})}{F_y(y_{th,i-1}) - F_y(y_{th,i})} \right) -$$

$$f_{xy}(x, y_{th,i}) \log \left( \frac{F_{xy}(x, y_{th,i+1}) - F_{xy}(x, y_{th,i})}{F_y(y_{th,i+1}) - F_y(y_{th,i})} \right)$$

In the above equation, the threshold index i may go from 1 to $2^{output\ bits} - 1$. Alternatively, or additionally, the index values i=0 and i=$2^{output\ bits}$ may refer to $y_{th,0}$=−inf and $y_{th,2^{outputbits}}$=+inf. Alternatively, or additionally, the corresponding CDF values may be $F_{xy}(x,y_{th,i})$=0 for i=0 and $F_{xy}(x,y_{th,i})$=1 for i=$2^{output\ bits}$.

The DSP signal may be quantized to a lower resolution in the quantization block 322, 422 using the known thresholds. The quantization block 322, 422 may perform a mapping to the symbols used on the electrical interface between the ODSP device 310, 410 and the TCL device 330, 430. The electrical interface may use pulse amplitude modulation (PAM)-4 modulation (e.g., four signal levels) and/or the quantization output may be four levels (e.g., level 0, level 1, level 2, and level 3). The PAM-4 modulation may be conveyed using 2 bits. An example mapping is provided in Table 2 below.

TABLE 2

Quantization To Four Levels And Mapping To PAM-4 Output Signal

| DSP output amplitude | PAM-4 level |
|---|---|
| $y \leq y_{th,1}$ | Level 0 |
| $y_{th,1} < y \leq y_{th,2}$ | Level 1 |
| $y_{th,2} < y \leq y_{th,3}$ | Level 2 |
| $y > y_{th,3}$ | Level 3 |

Alternatively, or additionally, the quantization output may be communicated using one or more non return to zero (NRZ)-modulated electrical interfaces and the quantization output may be mapped to bits using a coding scheme, such as binary code or Gray code. An example mapping to bits is provided in Table 3.

TABLE 3

An Example Of Mapping The Quantization Output To Bits

| DSP Output Amplitude | Binary Code | Gray Code |
|---|---|---|
| $y \leq y_{th,1}$ | 00 | 00 |
| $y_{th,1} < y \leq y_{th,2}$ | 01 | 01 |
| $y_{th,2} < y \leq y_{th,3}$ | 10 | 11 |
| $y > y_{th,3}$ | 11 | 10 |

LLR Calculation

The LLR calculation block 334, 434 may map the quantized signal levels (e.g., the output from the quantization block) to LLR values, which may be input into the FEC decoding block 332, 432 (e.g., a FEC decoder). Determining the LLR values may be performed using a look up table (LUT).

The contents of the LUT may be provided by the threshold optimization block 336, 426 and/or by the LLR training block 438. The input to the LLR calculation block 334, 434 may be considered a memoryless channel because the distortion caused by inter symbol interference may have been removed by the digital equalization.

In some examples, the LLR values (e.g., inputs to the FEC decoder) associated with the quantized signal levels y may be defined by the following equation:

$$llr_y = \log\left(p_{xy_q}(x = 0, y_q)\right) - \log\left(p_{xy_q}(x = 1, y_q)\right)$$

Alternatively, or additionally, the quantized signal levels y may include one or more correlations between consecutive values (e.g., $y_q^{t-1}$, $y_q^{t-1}$, $y_q^{t+1}$, etc.), which may be used in determining the LLR values. For time instance t, M consecutive values, e.g., $y_q^{t-1}$, $y_q^t$, $y_q^{t+1}$ for M=3 consecutive values may be mapped to a combined signal level $s^t$. For a N-bit representation of $y_q^t \in \{0, \ldots, 2^N-1\}$ the combined level $s^t$ may be defined by the following:

$$s^t = 2^{2N} y_q^t + 2^N y_q^{t-1} + y_q^{t+1}$$

Similarly, combining M=2 consecutive levels into one $s^t$ may be defined by the following:

$$s^t = 2^N y_q^t + y_q^{t-1}$$

The combined level $s^t$ may be quantized such that the combined level may have less than $2^{MN}$ levels. Correspondingly, the LLR values may be defined by the following equation:

$$llr_s = \log(p_{xs}(x = 0, s)) - \log(p_{xs}(x = 1, s))$$

The probabilities $p_{xy_q}(x,y_q)$ of the quantization block 322, 422 output (or $p_{xs}(x,s)$ for multiple quantization block outputs) and/or the LLR values that may be associated with the symbols received via the electrical interface may be calculated as part of the threshold optimization performed by the threshold optimization block 336, 426.

Alternatively, or additionally, the probabilities $p_{xy_q}(x,y_q)$ (or $p_{xs}(x,s)$) may be measured by the LLR calculation block 334, 434 in the TCL device based on a known pilot sequence. In such instances, a histogram measurement method, as described herein, may be applicable to determining the probabilities.

Alternatively, or additionally, the probabilities $p_{xy_q}(x,y_q)$ (or $p_{xs}(x,s)$) that may be calculated as part of the threshold optimization (as described herein) may be transmitted to the LLR calculation block 334, 434 in the TCL device 430, such as via a low rate overhead channel. In such instances, the LLR calculation block 334, 434 may use the probabilities to improve the LLR value calculations performed by the LLR calculation block 334, 434.

The LLR values may be quantized values (e.g., integers $-LLR_{max}$, $-LLR_{max}+1$, ..., $LLR_{max}+1$, $LLR_{max}$). As such, a correction of the quantization threshold may be . . . performed to account for the LLR quantization (e.g., such as when two amplitude values may map to the same quantized LLR value). For example, in the receiver of FIG. 1, the LLR quantization may be performed by the threshold optimization block 336 in the TCL device 330. In another example, the LLR calculation block 434 in the TCL device 430 may determine a threshold correction and transmit the threshold correction to the threshold optimization block 426 in the DSP module via a low rate overhead channel.

Figure 7:
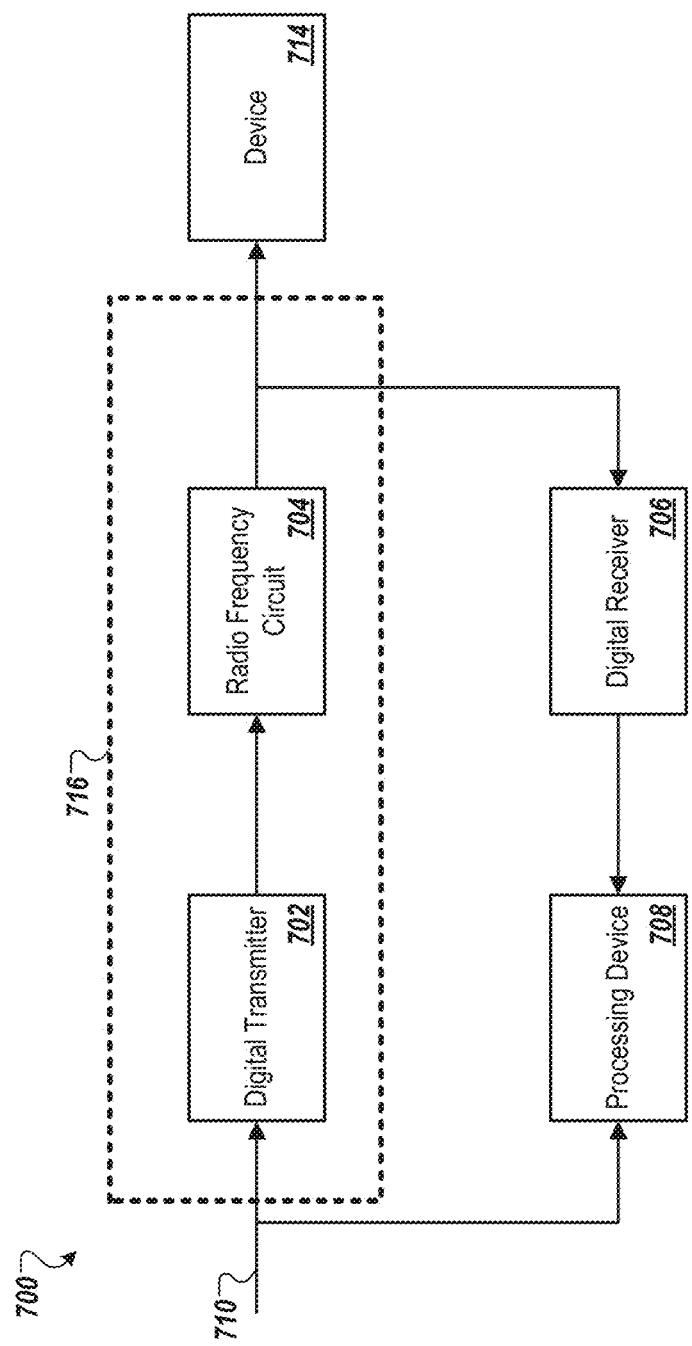
FIG. 7 illustrates an example communication system.

FIG. 7 illustrates a block diagram of an example communication system 700 in accordance with at least one example described in the present disclosure. The communication system 700 may include a digital transmitter 702, a radio frequency circuit 704, a device 714, a digital receiver 706, and a processing device 708. The digital transmitter 702 and the processing device may be configured to receive a baseband signal via connection 710. A transceiver 716 may comprise the digital transmitter 702 and the radio frequency circuit 704.

In some examples, the communication system 700 may include a system of devices that may be configured to communicate with one another via a wired or wireline connection. For example, a wired connection in the communication system 700 may include one or more Ethernet cables, one or more fiber-optic cables, and/or other similar wired communication mediums. Alternatively, or additionally, the communication system 700 may include a system of devices that may be configured to communicate via one or more wireless connections. For example, the communication system 700 may include one or more devices configured to transmit and/or receive radio waves, microwaves, ultrasonic waves, optical waves, electromagnetic induction, and/or similar wireless communications. Alternatively, or additionally, the communication system 700 may include combinations of wireless and/or wired connections. In these and other examples, the communication system 700 may include one or more devices that may be configured to obtain a baseband signal, perform one or more operations to the baseband signal to generate a modified baseband signal, and transmit the modified baseband signal, such as to one or more loads.

In some examples, the communication system 700 may include one or more communication channels that may communicatively couple systems and/or devices included in the communication system 700. For example, the transceiver 716 may be communicatively coupled to the device 714.

In some examples, the transceiver 716 may be configured to obtain a baseband signal. For example, as described herein, the transceiver 716 may be configured to generate a baseband signal and/or receive a baseband signal from another device. In some examples, the transceiver 716 may be configured to transmit the baseband signal. For example, upon obtaining the baseband signal, the transceiver 716 may be configured to transmit the baseband signal to a separate device, such as the device 714. Alternatively, or additionally, the transceiver 716 may be configured to modify, condition, and/or transform the baseband signal in advance of transmitting the baseband signal. For example, the transceiver 716 may include a quadrature up-converter and/or a digital to analog converter (DAC) that may be configured to modify the baseband signal. Alternatively, or additionally, the transceiver 716 may include a direct radio frequency (RF) sampling converter that may be configured to modify the baseband signal.

In some examples, the digital transmitter 702 may be configured to obtain a baseband signal via connection 710. In some examples, the digital transmitter 702 may be configured to up-convert the baseband signal. For example, the digital transmitter 702 may include a quadrature up-converter to apply to the baseband signal. In some examples, the digital transmitter 702 may include an integrated digital to analog converter (DAC). The DAC may convert the baseband signal to an analog signal, or a continuous time signal. In some examples, the DAC architecture may include a direct RF sampling DAC. In some examples, the DAC may be a separate element from the digital transmitter 702.

In some examples, the transceiver 716 may include one or more subcomponents that may be used in preparing the baseband signal and/or transmitting the baseband signal. For example, the transceiver 716 may include an RF front end (e.g., in a wireless environment) which may include a power amplifier (PA), a digital transmitter (e.g., 702), a digital front end, an Institute of Electrical and Electronics Engineers (IEEE) 1588v2 device, a Long-Term Evolution (LTE) physical layer (L-PHY), an (S-plane) device, a management plane (M-plane) device, an Ethernet media access control (MAC)/personal communications service (PCS), a resource controller/scheduler, and the like. In some examples, a radio (e.g., a radio frequency circuit 704) of the transceiver 716 may be synchronized with the resource controller via the S-plane device, which may contribute to high-accuracy timing with respect to a reference clock.

In some examples, the transceiver 716 may be configured to obtain the baseband signal for transmission. For example, the transceiver 716 may receive the baseband signal from a separate device, such as a signal generator. For example, the baseband signal may come from a transducer configured to convert a variable into an electrical signal, such as an audio signal output of a microphone picking up a speaker's voice. Alternatively, or additionally, the transceiver 716 may be configured to generate a baseband signal for transmission. In these and other examples, the transceiver 716 may be configured to transmit the baseband signal to another device, such as the device 714.

In some examples, the device 714 may be configured to receive a transmission from the transceiver 716. For example, the transceiver 716 may be configured to transmit a baseband signal to the device 714.

In some examples, the radio frequency circuit 704 may be configured to transmit the digital signal received from the digital transmitter 702. In some examples, the radio frequency circuit 704 may be configured to transmit the digital signal to the device 714 and/or the digital receiver 706. In some examples, the digital receiver 706 may be configured to receive a digital signal from the RF circuit and/or send a digital signal to the processing device 708.

In some examples, the processing device 708 may be a standalone device or system, as illustrated. Alternatively, or additionally, the processing device 708 may be a component of another device and/or system. For example, in some examples, the processing device 708 may be included in the transceiver 716. In instances in which the processing device 708 is a standalone device or system, the processing device 708 may be configured to communicate with additional devices and/or systems remote from the processing device 708, such as the transceiver 716 and/or the device 714. For example, the processing device 708 may be configured to send and/or receive transmissions from the transceiver 716 and/or the device 714. In some examples, the processing device 708 may be combined with other elements of the communication system 700.

Figure 8:
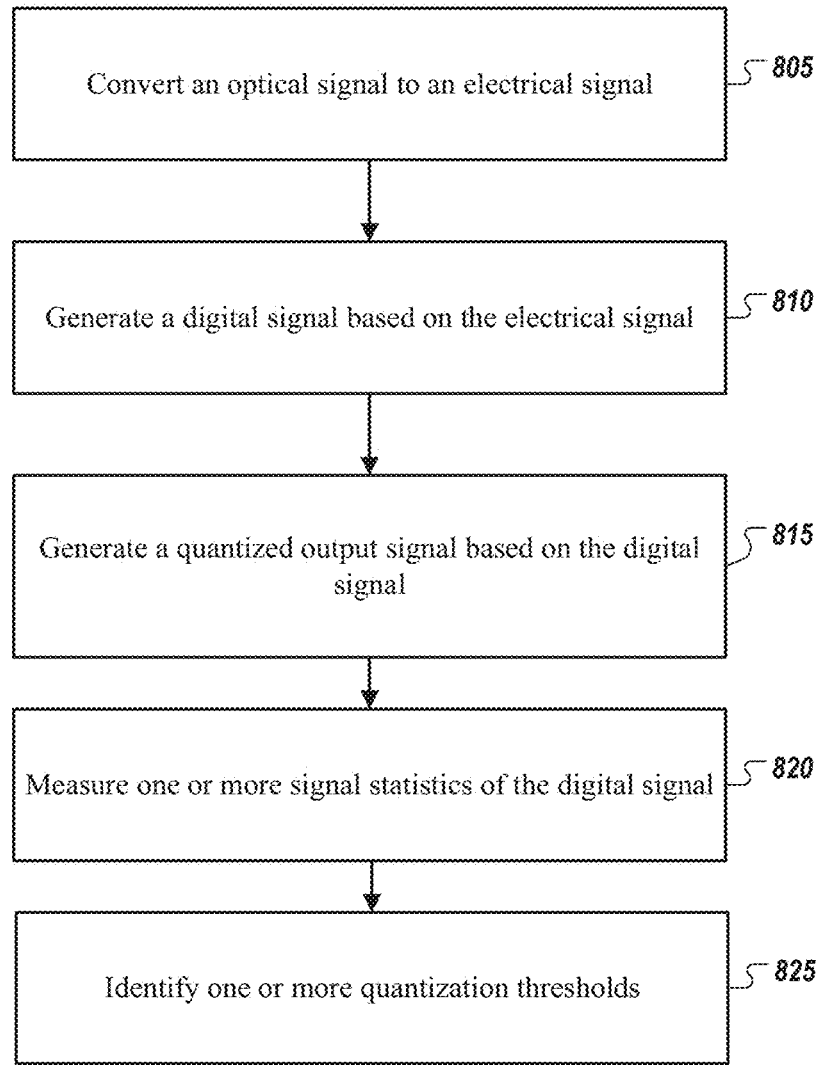
FIG. 8 illustrates an example process flow for a method used for a soft decision optical receiver.

FIG. 8 illustrates a process flow of an example method 800 of a soft decision optical receiver, in accordance with at least one example described in the present disclosure. The method 800 may be arranged in accordance with at least one example described in the present disclosure.

Figure 11:
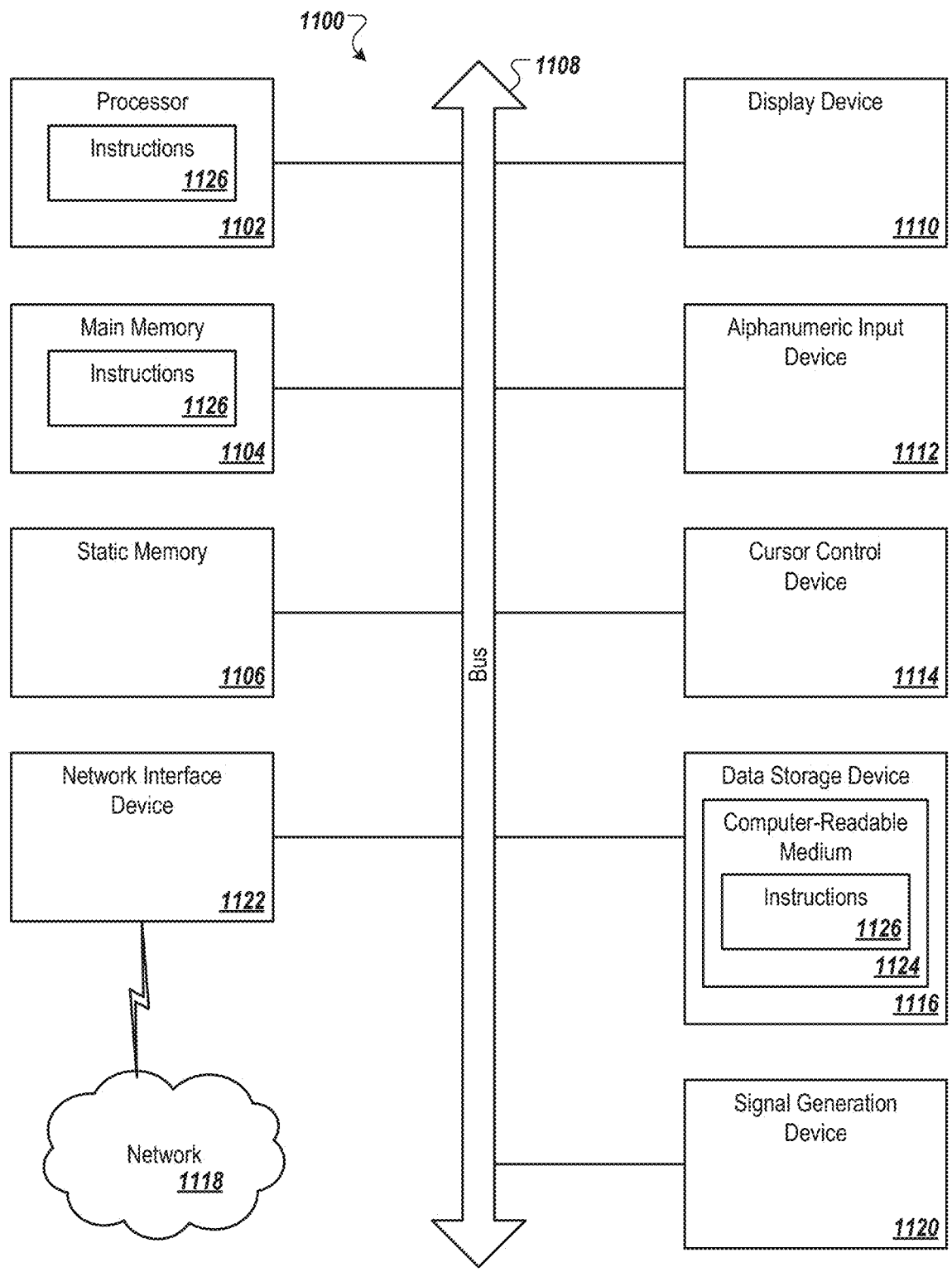
FIG. 11 illustrates a diagrammatic representation of a machine in the example form of a computing device within which a set of instructions, for causing the machine to perform any one or more of the methods discussed herein, may be executed.

The method 800 may be performed by processing logic that may include hardware (circuitry, dedicated logic, etc.), software (such as is run on a computer system or a dedicated machine), or a combination of both, which processing logic may be included in the processing device 1102 of FIG. 11, the communication system 700 of FIG. 7, or another device, combination of devices, or systems.

The method 800 may begin at block 805 where the processing logic may convert an optical signal to an electrical signal.

At block 810, the processing logic may generate a digital signal based on the electrical signal.

At block 815, the processing logic may generate a quantized output signal based on the digital signal.

At block 820, the processing logic may measure one or more signal statistics of the digital signal.

At block 825, the processing logic may identify one or more quantization thresholds.

The method 800 may include sending the one or more signal statistics of the digital signal to a transmission control layer (TCL) device. The method 800 may include receiving the one or more quantization thresholds from a transmission control layer (TCL) device.

The method 800 may include computing the one or more quantization thresholds at one or more of the processing device or a transmission control layer (TCL) device. The method 800 may include measuring the one or more signal statistics using one or more of a histogram measurement, a Gaussian probability density function, or a blind Gaussian approximation. The method 800 may include computing the one or more quantization thresholds using mutual information. The method 800 may include quantizing the quantization signal to a resolution based on the one or more quantization thresholds.

The method 800 may include modulating an electrical link between the ODSP device and a transmission control layer (TCL) device using pulse amplitude modulation (PAM)-4 modulation in which the PAM4 modulation is conveyed using 2 bits. The method 800 may include mapping the quantization signal to bits using one or more of a binary code or a Gray code.

Modifications, additions, or omissions may be made to the method 800 without departing from the scope of the present disclosure. For example, in some examples, the method 800 may include any number of other components that may not be explicitly illustrated or described.

Figure 9:
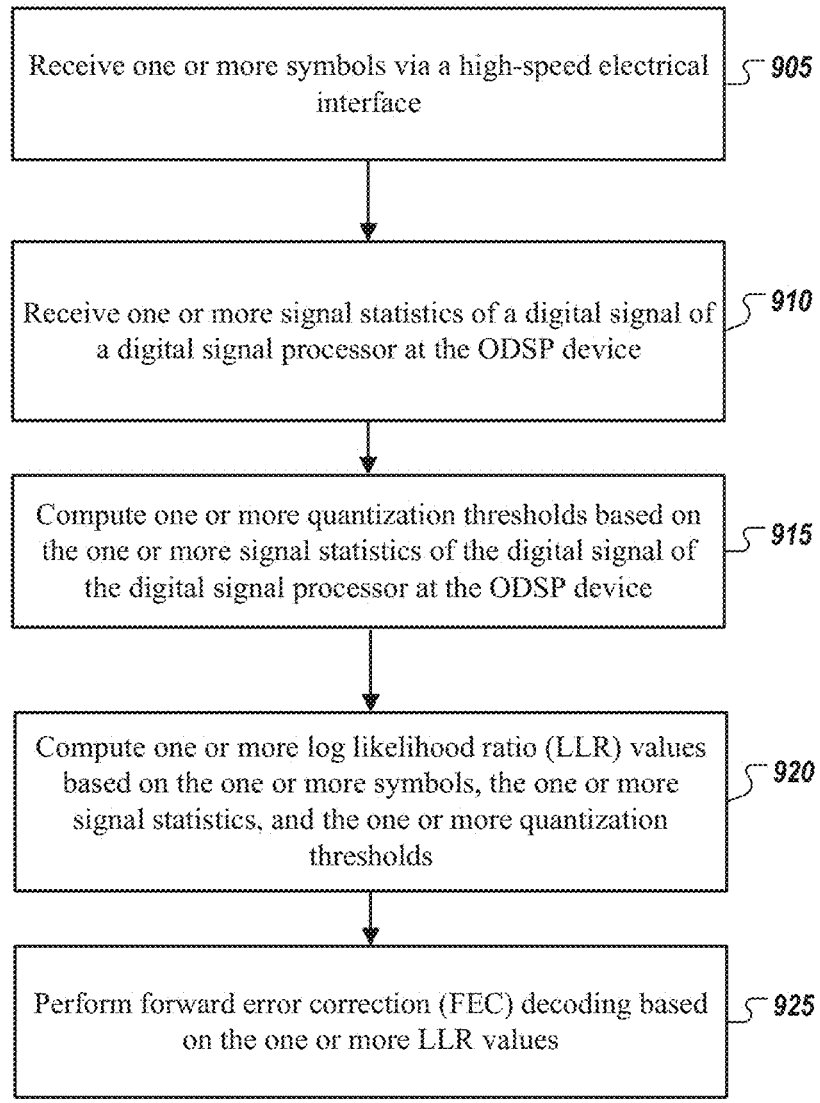
FIG. 9 illustrates an example process flow for a method used for a soft decision optical receiver.

FIG. 9 illustrates a process flow of an example method 900 that may be used for a soft decision optical receiver, in accordance with at least one example described in the present disclosure. The method 900 may be arranged in accordance with at least one example described in the present disclosure.

The method 900 may be performed by processing logic that may include hardware (circuitry, dedicated logic, etc.), software (such as is run on a computer system or a dedicated machine), or a combination of both, which processing logic may be included in the processing device 1102 of FIG. 11, the communication system 700 of FIG. 7, or another device, combination of devices, or systems.

The method 900 may begin at block 905 where the processing logic may receive one or more symbols via a high-speed electrical interface. The one or more symbols may be received at the TCL device from an ODSP device.

At block 910, the processing logic may receive one or more signal statistics of a digital signal of a digital signal processor at the ODSP device. The one or more signal statistics may be received at the TCL device from the ODSP device.

At block 915, the processing logic may compute one or more quantization thresholds based on the one or more signal statistics of the digital signal of the digital signal processor at the ODSP device. The one or more quantization thresholds may be computed at the TCL device.

At block 920, the processing logic may compute one or more log likelihood ratio (LLR) values based on the one or more symbols, the one or more signal statistics, and the one or more quantization thresholds. The one or more LLR values may be computed at the TCL device.

At block 925, the processing logic may perform forward error correction (FEC) decoding based on the one or more LLR values. The FEC decoding may be performed at the TCL device.

The method 900 may include computing, at the TCL device, LLR training data based on an input signal to the TCL device. The method 900 may include receiving, at the TCL device, the one or more quantization thresholds from the ODSP device via a control communication. The method 900 may include sending, from the TCL device to the ODSP device, the one or more quantization thresholds via a low-speed control communication. The method 900 may include computing, at the TCL device, the one or more LLR values based on a known pilot sequence. The method 900 may include computing, at the TCL device, the one or more LLR values using a threshold correction.

Modifications, additions, or omissions may be made to the method 900 without departing from the scope of the present disclosure. For example, in some examples, the method 900 may include any number of other components that may not be explicitly illustrated or described.

Figure 10:
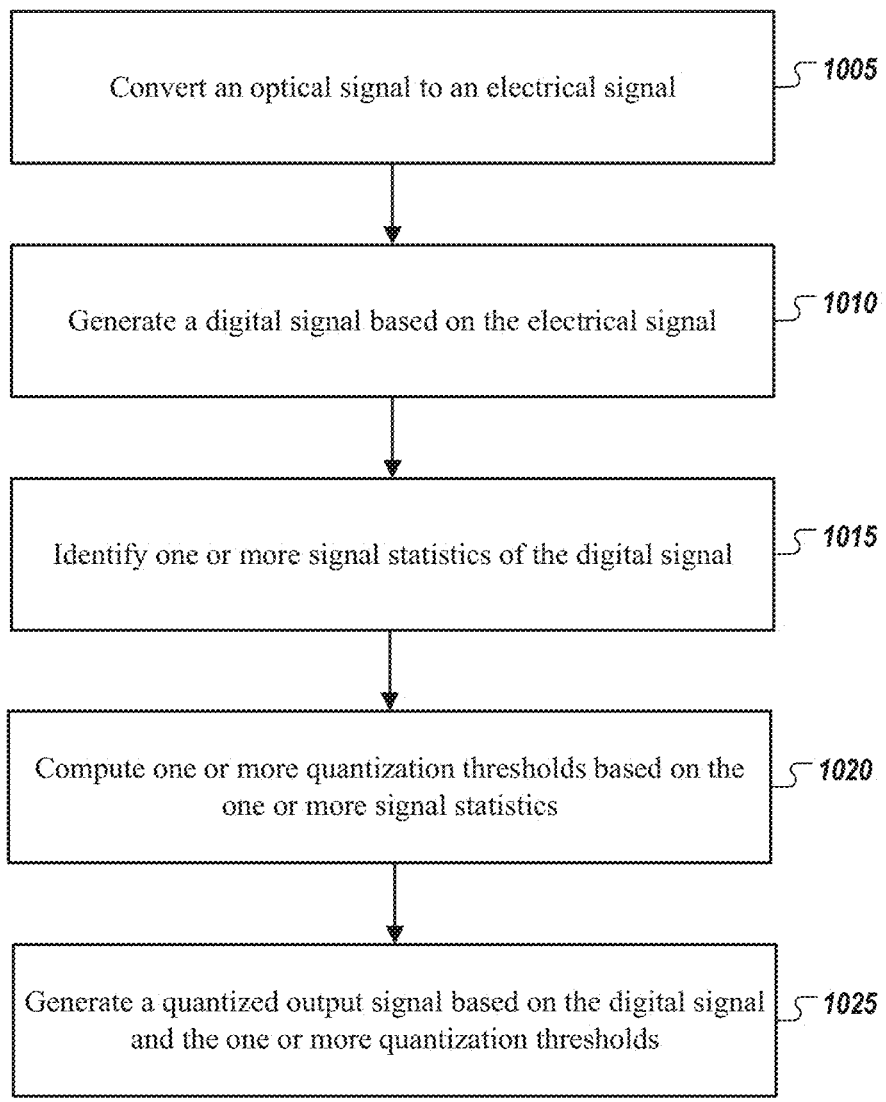
FIG. 10 illustrates an example process flow for a method used for a soft decision optical receiver.

FIG. 10 illustrates a process flow of an example method 1000 that may be used for a soft decision optical receiver, in accordance with at least one example described in the present disclosure. The method 1000 may be arranged in accordance with at least one example described in the present disclosure.

The method 1000 may be performed by processing logic that may include hardware (circuitry, dedicated logic, etc.), software (such as is run on a computer system or a dedicated machine), or a combination of both, which processing logic may be included in the processing device 1102 of FIG. 11, the communication system 700 of FIG. 7, or another device, combination of devices, or systems.

The method 1000 may begin at block 1005 where the processing logic may convert an optical signal to an electrical signal. The optical signal may be converted to the electrical signal at a photodiode of the ODSP device.

At block 1010, the processing logic may generate a digital signal based on the electrical signal. The digital signal may be generated at an ADC of the ODSP device, At block 1015, the processing logic may identify one or more signal statistics of the digital signal. The one or more signal statistics may be identified at a processing device of the ODSP device.

At block 1020, the processing logic may compute one or more quantization thresholds based on the one or more signal statistics. The one or more quantization thresholds may be computed at one or more of the processing device of the ODSP device or a processing device of the TCL device.

At block 1025, the processing logic may generate a quantized output signal based on the digital signal and the one or more quantization thresholds. The quantized output signal may be generated at a quantization component of the ODSP device.

Modifications, additions, or omissions may be made to the method 1000 without departing from the scope of the present disclosure. For example, in some examples, the method 1000 may include any number of other components that may not be explicitly illustrated or described.

For simplicity of explanation, methods and/or process flows described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

FIG. 11 illustrates a diagrammatic representation of a machine in the example form of a computing device 1100 within which a set of instructions, for causing the machine to perform any one or more of the methods discussed herein, may be executed. The computing device 1100 may include a rackmount server, a router computer, a server computer, a mainframe computer, a laptop computer, a tablet computer, a desktop computer, or any computing device with at least one processor, etc., within which a set of instructions, for causing the machine to perform any one or more of the methods discussed herein, may be executed. In alternative examples, the machine may be connected (e.g., networked) to other machines in a local area network (LAN), an intranet, an extranet, or the Internet. The machine may operate in the capacity of a server machine in client-server network environment. Further, while only a single machine is illustrated, the term "machine" may also include any collection of machines that individually or jointly execute a set (or multiple sets) of instructions to perform any one or more of the methods discussed herein.

The example computing device 1100 includes a processing device (e.g., a processor) 1102, a main memory 1104 (e.g., read-only memory (ROM), flash memory, dynamic random access memory (DRAM) such as synchronous DRAM (SDRAM)), a static memory 1106 (e.g., flash memory, static random access memory (SRAM)) and a data storage device 1116, which communicate with each other via a bus 1108.

Processing device 1102 represents one or more general-purpose processing devices such as a microprocessor, central processing unit, or the like. More particularly, the processing device 1102 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 1102 may also include one or more special-purpose processing devices such as an application specific integrated circuit (ASIC), a field programmable gate array (FPGA), a digital signal processor (DSP), network processor, or the like. The processing device 1102 is configured to execute instructions 1126 for performing the operations and steps discussed herein.

The computing device 1100 may further include a network interface device 1122 which may communicate with a network 1118. The computing device 1100 also may include a display device 1110 (e.g., a liquid crystal display (LCD) or a cathode ray tube (CRT)), an alphanumeric input device 1112 (e.g., a keyboard), a cursor control device 1114 (e.g., a mouse) and a signal generation device 1120 (e.g., a speaker). In at least one example, the display device 1110, the alphanumeric input device 1112, and the cursor control device 1114 may be combined into a single component or device (e.g., an LCD touch screen).

The data storage device 1116 may include a computer-readable storage medium 1124 on which is stored one or more sets of instructions 1126 embodying any one or more of the methods or functions described herein. The instructions 1126 may also reside, completely or at least partially, within the main memory 1104 and/or within the processing device 1102 during execution thereof by the computing device 1100, the main memory 1104 and the processing device 1102 also constituting computer-readable media. The instructions may further be transmitted or received over a network 1118 via the network interface device 1122.

While the computer-readable storage medium 1124 is shown in an example to be a single medium, the term "computer-readable storage medium" may include a single medium or multiple media (e.g., a centralized or distributed database and/or associated caches and servers) that store the one or more sets of instructions. The term "computer-readable storage medium" may also include any medium that is capable of storing, encoding or carrying a set of instructions for execution by the machine and that cause the machine to perform any one or more of the methods of the present disclosure. The term "computer-readable storage medium" may accordingly be taken to include, but not be limited to, solid-state memories, optical media and magnetic media.

A number of implementations have been described. Nevertheless, it will be understood that various modifications may be made without departing from the spirit and scope of the disclosure. Accordingly, other implementations are within the scope of the following claims.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various examples of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

In some examples, the different components, modules, engines, and services described herein may be implemented as objects or processes that execute on a computing system (e.g., as separate threads). While some of the systems and methods described herein are generally described as being implemented in software (stored on and/or executed by hardware), specific hardware implementations or a combination of software and specific hardware implementations are also possible and contemplated.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although examples of the present disclosure have been described in detail, it should be understood that the various changes, substitutions, and alterations could be made hereto without departing from the spirit and scope of the present disclosure.

What is claimed is:

1. A device, comprising:
an optical and digital signal processing (ODSP) device comprising:
a photodiode operable to convert an optical signal to an electrical signal;
a digital signal processor operable to generate a digital signal based on the electrical signal;
a quantization component operable to generate a quantized output signal based on the digital signal; and
a processing device operable to:
measure one or more signal statistics of the digital signal; and
identify one or more quantization thresholds, wherein the one or more quantization thresholds are computed based on the one or more signal statistics.

2. The device of claim 1, wherein the ODSP device further comprises an overhead channel operable to send the one or more signal statistics of the digital signal to a transmission control layer (TCL) device.

3. The device of claim 1, wherein the ODSP device further comprises an overhead channel operable to receive the one or more quantization thresholds from a transmission control layer (TCL) device.

4. The device of claim 1, further comprising computing the one or more quantization thresholds at one or more of the processing device or a transmission control layer (TCL) device.

5. The device of claim 1, further comprising measuring the one or more signal statistics using one or more of a histogram measurement, a Gaussian probability density function, or a blind Gaussian approximation.

6. The device of claim 1, further comprising computing the one or more quantization thresholds using mutual information.

7. The device of claim 1, wherein the quantization component is further operable to quantize the quantization signal to a resolution based on the one or more quantization thresholds.

8. The device of claim 1, further comprising modulating an electrical link between the ODSP device and a transmission control layer (TCL) device using pulse amplitude modulation (PAM)-4 modulation, wherein the PAM-4 modulation is conveyed using 2 bits.

9. The device of claim 1, wherein the quantization component is further operable to map the quantization signal to bits using one or more of a binary code or a Gray code.

10. A device, comprising:
an electrical link between an optical and digital signal processing (ODSP) device and a transmission control layer (TCL) device, wherein the TCL device is operable to:
receive, at the TCL device from an optical and digital signal processing (ODSP) device, one or more symbols via a high-speed electrical interface;
receive, at the TCL device from the ODSP device, one or more signal statistics of a digital signal of a digital signal processor at the ODSP device;
compute, at the TCL device, one or more quantization thresholds based on the one or more signal statistics of the digital signal of the digital signal processor at the ODSP device;
compute, at the TCL device, one or more log likelihood ratio (LLR) values based on the one or more symbols, the one or more signal statistics, and the one or more quantization thresholds; and
perform, at the TCL device, forward error correction (FEC) decoding based on the one or more LLR values.

11. The device of claim 10, wherein the TCL device is further operable to:
compute, at the TCL device, LLR training data based on an input signal to the TCL device.

12. The device of claim 10, wherein the TCL device is further operable to:
receive, at the TCL device, the one or more quantization thresholds from the ODSP device via a control communication.

13. The device of claim 10, wherein the TCL device is further operable to:
send, from the TCL device to the ODSP device, the one or more quantization thresholds via a control communication.

14. The device of claim 10, wherein the TCL device is further operable to:
compute, at the TCL device, the one or more LLR values based on a known pilot sequence.

15. The device of claim 10, wherein the TCL device is further operable to:
compute, at the TCL device, the one or more LLR values using a threshold correction.

16. A method, comprising:
converting, at a photodiode of an optical and digital signal processing (ODSP) device, an optical signal to an electrical signal;
generating, at an analog to digital converter (ADC) of the ODSP device, a digital signal based on the electrical signal;
identifying, at a processing device of the ODSP device, one or more signal statistics of the digital signal;
computing, at one or more of the processing device of the ODSP device or a processing device of a transmission control layer (TCL) device, one or more quantization thresholds based on the one or more signal statistics; and
generating, at a quantization component of the ODSP device, a quantized output signal based on the digital signal and the one or more quantization thresholds.

17. The method of claim 16, further comprising:
measuring, at the processing device of the ODSP device, the one or more signal statistics using one or more of a histogram measurement, a Gaussian probability density function, or a blind Gaussian approximation.

18. The method of claim 16, further comprising:
computing, at the processing device of the ODSP device, the one or more quantization thresholds using mutual information.

19. The method of claim 16, further comprising:
quantizing, at the quantization component of the ODSP device, the quantization signal to a resolution based on the quantization thresholds.

20. The method of claim 16, further comprising:
modulating, at the processing device of the ODSP device, an electrical link between a transmission control layer (TCL) device and the ODSP device using pulse amplitude modulation (PAM)-4 modulation, wherein the PAM-4 modulation is conveyed using 2 bits.

21. The method of claim 16, further comprising:
mapping, at the quantization component of the ODSP device, the quantization signal to bits using one or more of a binary code or a Gray code.

* * * * *